United States Patent
Pandey et al.

(10) Patent No.: US 12,505,576 B2
(45) Date of Patent: Dec. 23, 2025

(54) SYSTEM AND METHOD FOR CALIBRATING A CAMERA IN A VEHICLE

(71) Applicant: Continental Autonomous Mobility Germany GmbH, Ingolstadt (DE)

(72) Inventors: Abhinav Pandey, Polegate (GB); Nauman Javed, Burgess Hill (GB); Rodolfo Cignoli, Hove (GB); Saharsh Bishnoi, Lancing (GB); Alexander Kadyrov, Eastbourne (GB); Robert Gillott, Hove (GB)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 561 days.

(21) Appl. No.: 17/996,681

(22) PCT Filed: Apr. 15, 2021

(86) PCT No.: PCT/EP2021/059754
§ 371 (c)(1),
(2) Date: Oct. 20, 2022

(87) PCT Pub. No.: WO2021/213879
PCT Pub. Date: Oct. 28, 2021

(65) Prior Publication Data
US 2023/0230279 A1 Jul. 20, 2023

(30) Foreign Application Priority Data
Apr. 22, 2020 (EP) .................................. 20170748

(51) Int. Cl.
*G06T 7/80* (2017.01)
*G06T 7/73* (2017.01)
(Continued)

(52) U.S. Cl.
CPC .................. *G06T 7/80* (2017.01); *G06T 7/74* (2017.01); *H04N 17/002* (2013.01);
(Continued)

(58) Field of Classification Search
None
See application file for complete search history.

(56) References Cited

U.S. PATENT DOCUMENTS

2009/0290032 A1 11/2009 Zhang et al.
2011/0216201 A1 9/2011 McAndrew et al.
(Continued)

FOREIGN PATENT DOCUMENTS

| EP | 2858035 A1 | 4/2015 |
|---|---|---|
| JP | 2012504889 A | 2/2012 |

(Continued)

OTHER PUBLICATIONS

European Patent Office Search Report dated Oct. 9, 2020 for the counterpart European Patent Application No. 20170748.6.
(Continued)

*Primary Examiner* — Tahmina N Ansari
(74) *Attorney, Agent, or Firm* — Fitch, Even, Tabin & Flannery LLP

(57) ABSTRACT

A method for determining extrinsic camera parameters includes: starting camera movement, capturing a first raw image with parallel first and second patches at a first point of time, and a second raw image with parallel third and fourth patches at a second point of time. A distance between the first and second patches and between the third and fourth patches is the same. A reference position A of a first patch image feature, a reference position C of a second patch image feature, an offset position B of the feature of the first patch in the third patch, and an offset position D of the feature of the second patch in the fourth patch are detected.

(Continued)

An epipolar model is applied based on the positions A-D and a distance travelled by the camera between the first and second time points. Extrinsic camera parameters are determined from the epipolar model.

15 Claims, 10 Drawing Sheets

(51) Int. Cl.
*H04N 17/00* (2006.01)
*H04N 23/695* (2023.01)

(52) U.S. Cl.
CPC . *H04N 23/695* (2023.01); *G06T 2207/20056* (2013.01); *G06T 2207/30244* (2013.01); *G06T 2207/30252* (2013.01)

(56) References Cited

U.S. PATENT DOCUMENTS

| | | | |
|---|---|---|---|
| 2011/0228101 A1* | 9/2011 | Miksch | H04N 17/002 348/175 |
| 2016/0245641 A1* | 8/2016 | Kowdle | G01B 11/026 |
| 2018/0356831 A1* | 12/2018 | Luo | G01S 7/4808 |
| 2019/0197982 A1* | 6/2019 | Chi | H04N 13/239 |
| 2021/0027496 A1* | 1/2021 | Koyama | G06T 7/73 |
| 2023/0230279 A1* | 7/2023 | Pandey | G06T 7/74 348/148 |

FOREIGN PATENT DOCUMENTS

| | | |
|---|---|---|
| WO | 2010038224 A1 | 4/2010 |
| WO | 2010038224 A8 | 4/2010 |
| WO | 2012139636 A1 | 10/2012 |
| WO | 2019225681 A1 | 11/2019 |

OTHER PUBLICATIONS

The International Search Report and the Written Opinion of the International Searching Authority mailed May 6, 2021 on for the counterpart PCT Application No. PCT/EP2021/059754.
Notice of Reasons for Refusal drafted on Dec. 19, 2023 for the counterpart Japanese Patent Application No. 2022-557818 and machine translation of same.
Decision to Grant a Patent drafted on Mar. 1, 2024 for the counterpart Japanese Patent Application No. 2022-557818 and machine translation of same.
Notice of Reasons for Refusal drafted Sep. 5, 2023 for the counterpart Japanese Patent Application No. 2022-557818 and Global Dossier translation of same.
Examination Report dated Nov. 13, 2024 for the counterpart European Patent Application No. 20 170 748.6.

* cited by examiner

SYSTEM AND METHOD FOR CALIBRATING A CAMERA IN A VEHICLE

CROSS-REFERENCE TO RELATED APPLICATIONS

The present application is a National Stage Application under 35 U.S.C. § 371 of International Patent Application No. PCT/EP2021/059754 filed on Apr. 15, 2021, and claims priority from European Patent Application No. 20170748.6 filed on Apr. 22, 2020, in the European Patent Office, the disclosures of which are herein incorporated by reference in their entireties.

TECHNICAL FIELD

The invention relates to a method and a system for single camera calibration, to a use of a single camera calibration system for determining extrinsic parameters of a camera mounted on a vehicle, a computer program element, and a computer-readable medium.

BACKGROUND

Extrinsic parameters of the rear camera of a vehicle as, for example, pitch, yaw, and roll angles and height, are conventionally computed using a pre-defined target. The camera to be calibrated detects a pattern with known dimensions on the target. The resulting images are processed by an extrinsics solver to compute the extrinsics of the camera. In order to obtain a good result, the target has to be maintained very well, and good, lab-like environmental conditions with bright lighting have to be provided. Any variations in the lighting and the cleanliness of the target affects the accuracy measurements of the calibration, which is laborious and time-consuming and therefore expensive.

SUMMARY

There may, therefore, be a need to reduce the effort and the costs to calibrate a camera.

The problem is addressed by the subject-matter of the independent claims. Embodiments are provided by the dependent claims, the following description and the accompanying figures.

The described embodiments similarly pertain to the method for single camera calibration, a system for single camera calibration, a use of for single camera calibration, a computer program element, and a computer-readable medium.

Further, it shall be noted that all embodiments of the present disclosure concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a method for determining extrinsic parameters of a camera is provided. The method includes the following steps. First, a camera is started to move. In a second step, a first raw image with a first patch and a second patch parallel to first patch at a first point of time is captured, and a second raw image with a third patch and a fourth patch parallel to third patch at a second point of time is captured, wherein a distance between the first patch and the second patch is the same as the distance between the third patch and the fourth patch. In the next step, a reference position A of at least one image feature in the first patch, a reference position C of at least one image feature in the second patch, an offset position B of the at least one image feature of the first patch in the third patch, and an offset position D of the at least one image feature of the second patch in the fourth patch are detected. In a following step, an epipolar model based on the reference positions A and C, the offset positions B and D and the determined distance travelled by the moving camera between the first point of time and the second point of time are applied; and finally, extrinsic parameters of the camera are determined as an output of the epipolar model.

In other words, a moving camera captures images, each picturing a part of the road. Patches 1 and 3 are parallel or quasi-parallel to patches 2 and 4, respectively. Let's say the patches 1 and 3 are patches on a left side with respect to a camera orientation, and the second and fourth patches are on the right side. The first image with the first and second patches and the second image with the third and fourth patches may be captured one briefly after the other, so that the left patches and thus also image features, overlap in parts. The same applies to the right patches. As the images are captured by one camera, the distance between the left and the right patches are quasi the same on each image. The detected features may represent a point on each image of the camera coordinate system, therefore four positions or points A, B, C, and D are obtained. These coordinates together with the real distance of A and B are the input for an epipolar model, which is explained further below in detail. This input allows to geometrically determine the direction of the movement of the camera, or to derive a straight movement and a rotation, in case the movement was not straight. Further, it is possible to determine the height of the camera, so that all wanted extrinsic parameters can be determined.

The term "patch" is used for the pictured content of the image. It can be any moving texture under the camera, i.e., region of interest. This may be, for example, in case the camera is mounted on a vehicle, the asphalt structure of the road.

According to an embodiment, the movement of the camera is a linear movement, a circular movement, or both. Since the non-linear movement is virtually split into a linear movement and a rotation, the real ("true") path may be any path. In a pure linear movement, no or nearly no rotation will be detected. A true circular path will result in a linear movement and a rotation.

According to an embodiment, the camera is a fisheye camera, and detecting a reference position A, an offset position B, a reference position C, and an offset position D includes a ground plane mapping of the first, the second, the third and the fourth patch to obtain corresponding patches as 2-dimensional ground plane images in a virtual plane in a pre-defined image format. A ground plane has configurable parameters associated with it, for example, width and height of the patch in meters in real world, its projection, i.e., width and length in pixels and the offsets that determine how far the ground plane is placed in front of the vehicle from a camera frame of reference. A spherical model may be used for the fisheye camera. This means that for each pixel in the fisheye image a point is reserved on the unit sphere. The sphere has a right-angled coordinate system with an origin O and axes x, y, z, which is called camera coordinate system in this disclosure. For ground plane mapping, the algorithm picks two patches from the real planar surface, for example the road surface. The picked patches with, e.g., 128×256 pixels represent a virtual plane on which the real planar or road surface is projected.

According to an embodiment, the first, second, third and fourth patch in the virtual plane are pre-processed, wherein the pre-processing includes subtracting a mean brightness value and applying a Gaussian window, wherein the Gaussian window has a maximum in the center of an image, and a minimum at the edge of an image.

That is, the input of the pre-processing are ground plane images with the road patches in a virtual plane in a pre-defined format. The pre-processing is carried out for each of the four ground plane images or ground plane patches, respectively. The mean brightness value of an image is subtracted from the original image and then the resultant image is multiplied with a Gaussian window image. The Gaussian window image suppresses the pixels near the edge of the image and emphasizes the features near the center of the image.

According to an embodiment, the offset position B of the third patch with respect to the reference position A of the first patch, and the offset position D of the fourth patch with respect to the reference position C of the second patch are determined by performing a phase-correlation.

According to an embodiment, the phase correlation includes a Fast Fourier Transformation, FFT. The reference positions A and C may be obtained by an auto-correlation of the images or equivalently, by determining the center of the image, and the offset positions B and D are determined by phase correlation of the first patch with the third patch, and the second patch with the fourth patch. More specifically, the correlations are carried out by Fourier transforming the features of the images and multiplying the corresponding such transformed images. The reason for a reference position being the center of an image is that correlating an image with a non-shifted pendant corresponds to an auto-correlation and results in a peak in the center of the image.

According to an embodiment, the reference positions A and C, and the offset positions B, and D are relative positions and the offset is determined using a gradient based similarity measure. In other words, the offsets from phase correlation output (FFTs) are obtained, and gradients of first image patches, i.e., the first and the second patch, and second image patches, i.e., the third and the fourth patch, are computed. The gradients of the second image patches are shifted. Then, the dot product between the gradients of the second and first image patches are computed.

The resultant image is blurred or filtered to obtain the pixel coordinate, i.e., location, which has the highest similarity.

According to an embodiment, detecting the offset position B and the offset position D further includes determining ground plane unit vectors from the camera to the reference positions A and C, and to the offset positions B and D. Note that in this processing stage only the direction from the camera, i.e., the origin of the camera coordinate system, to the positions A, B, C, D is known. Although the offsets are known, the absolute positions in the coordinate system are not known. Therefore, the unit vectors are determined rather than vectors from the origin to the positions. The offsets provide one of several constraints used in following steps to determine the extrinsics.

According to an embodiment, applying an epipolar model includes using the ground plane unit vectors to determine in a first sub-step a first direction V from reference position A to the offset position C, which is the same direction as from the reference position B to the offset position D, and a second direction W from the reference position A to the reference position B, which is the same direction as from the offset position C to the offset position D, determining the normal vector N=V×W of the first direction V and the second direction W, and determining the height of the camera H by determining the vectors from the origin to real positions A', B', C' and D' corresponding to the image positions A, B, C and D, respectively.

According to a further aspect, a single camera calibration system for calibrating a camera is provided, including a camera controller configured to control a camera to be calibrated such that the camera captures, when in motion, a first raw image with a first patch and a second patch parallel to first patch at a first point of time, and a second raw image with a third patch and a fourth patch parallel to third patch at a second point of time, wherein a distance between first patch and a second patch is the same as the distance between third patch and a fourth patch. The single camera calibration system further includes a processing module, configured to detect a reference position A of at least one image feature in the first patch, a reference position C of at least one image feature in the second patch, an offset position B of the at least one image feature of the first patch in the third patch, and an offset position D of the at least one image feature of the second patch in the fourth patch. The processing module is further configured to apply an epipolar model based on the reference positions A and C, the offset positions B and D and a determined distance travelled by the moving camera between the first point of time and the second point of time, and is furthermore configured to determine extrinsic parameters of the camera as an output of the epipolar model.

According to an embodiment, the system further includes a camera controlled by the camera controller, wherein the camera is mounted on a vehicle.

According to a further aspect, a vehicle is provided including a single camera calibration system as described above for calibrating a camera.

According to a further aspect, the use of a single camera calibration system as described above for determining extrinsic parameters of a camera mounted on a vehicle is described.

In an example, a data processing system, e.g., a computer, including means for carrying out the steps of the method is provided. The data processing system may include circuits without programmable logics or may be or include a micro controller, a field programmable gate array (FPGA), an application specific integrated circuit (ASIC), a Complex Programmable Logic Device (CPLD), or any other programmable logic devices known to persons skilled in the art.

According to a further aspect, a computer program element is provided that includes instructions, which, when the program is executed by a computer, cause the computer to carry out the steps of the method. The computer program element may be part of a computer program, but it can also be an entire program by itself. For example the computer program element may be used to update an already existing computer program to get to the present disclosure.

According to a further aspect, a computer-readable medium is provided, that includes instructions which, when executed by a computer, cause the computer to carry out the steps of the method. The computer readable medium may be seen as a storage medium, such as for example, a USB stick, a CD, a DVD, a data storage device, a hard disk, integrated on-chip memory of an embedded system or any other medium on which a program element as described above can be stored.

The algorithm thus solves the problem of estimating the extrinsics of the camera as the vehicle is driven in an EOL (end of line) factory, service stations and normal driving conditions. The algorithm requires a camera with known intrinsics in form of, e.g., CAD values of the rear camera, i.e., X and Y position, rotation about x, y and z axes of the camera. Further, it requires speed, steering and suspension signals of the vehicle, and images captured by the camera with its corresponding signals mentioned in the above point.

The algorithm is a very light algorithm which can be implemented in embedded platforms having limited resources in terms of runtime and memory. There is no need to maintain a dedicated target or pattern for single camera calibration, and no dedicated space or environment for calibration has to be provided. The camera can be calibrated while it's driven in EOL or when it's on the conveyor belt, as the camera can see the moving images. The algorithm may be adapted to work related to surround view system with four cameras.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings.

The figures are merely schematic representations and serve only to illustrate embodiments of the present disclosure. Identical or equivalent elements are in principle provided with the same reference signs.

DETAILED DESCRIPTION

Figure 1:
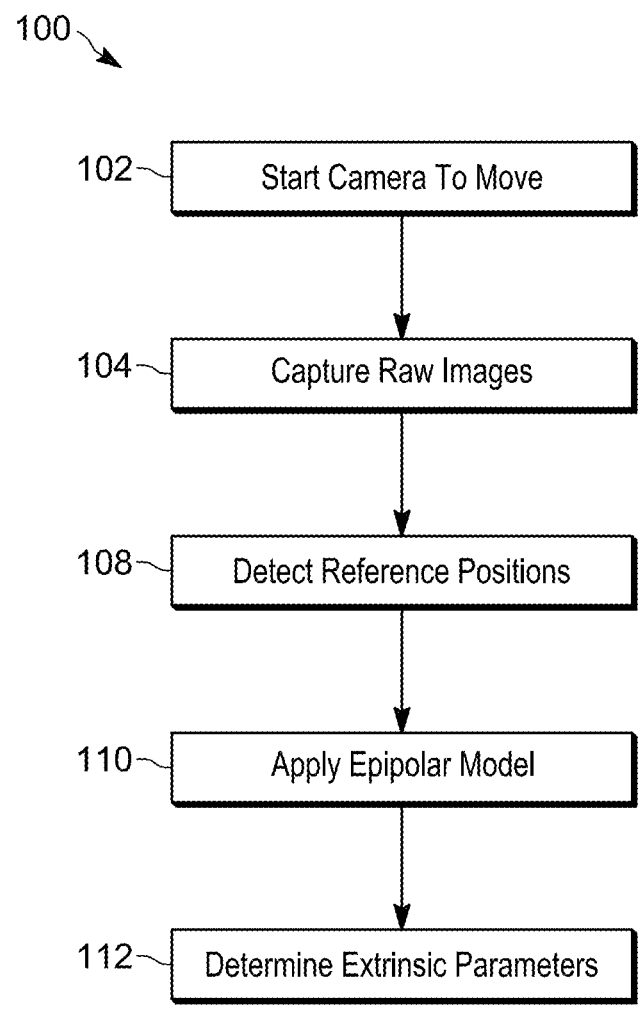
FIG. 1 shows a flow diagram of the method for determining extrinsic parameters of a camera.

FIG. 1 shows a flow diagram of the method 100 for determining extrinsic parameters of a camera, including the following steps. In a first step 102, a camera is started to move. In a second step 104 by the moving camera, two raw images are captured one after the other at two different positions. A first raw image with a first patch and a second patch parallel to first patch at a first point of time is captured, and a second raw image with a third patch and a fourth patch parallel to third patch at a second point of time, wherein a distance between first patch and a second patch is the same as the distance between third patch and a fourth patch. In a next step 108, a reference position A of at least one image feature is detected in the first patch, a reference position C of at least one image feature is detected in the second patch, an offset position B of the at least one image feature of the first patch is detected in the third patch, and an offset position D of the at least one image feature of the second patch is detected in the fourth patch. In a further step 110, an epipolar model is applied based on the reference positions A and C, the offset positions B and D and a determined distance travelled by the moving camera between the first point of time and the second point of time. In a last step 112, extrinsic parameters of the camera are determined as an output of the epipolar model.

Figure 2:
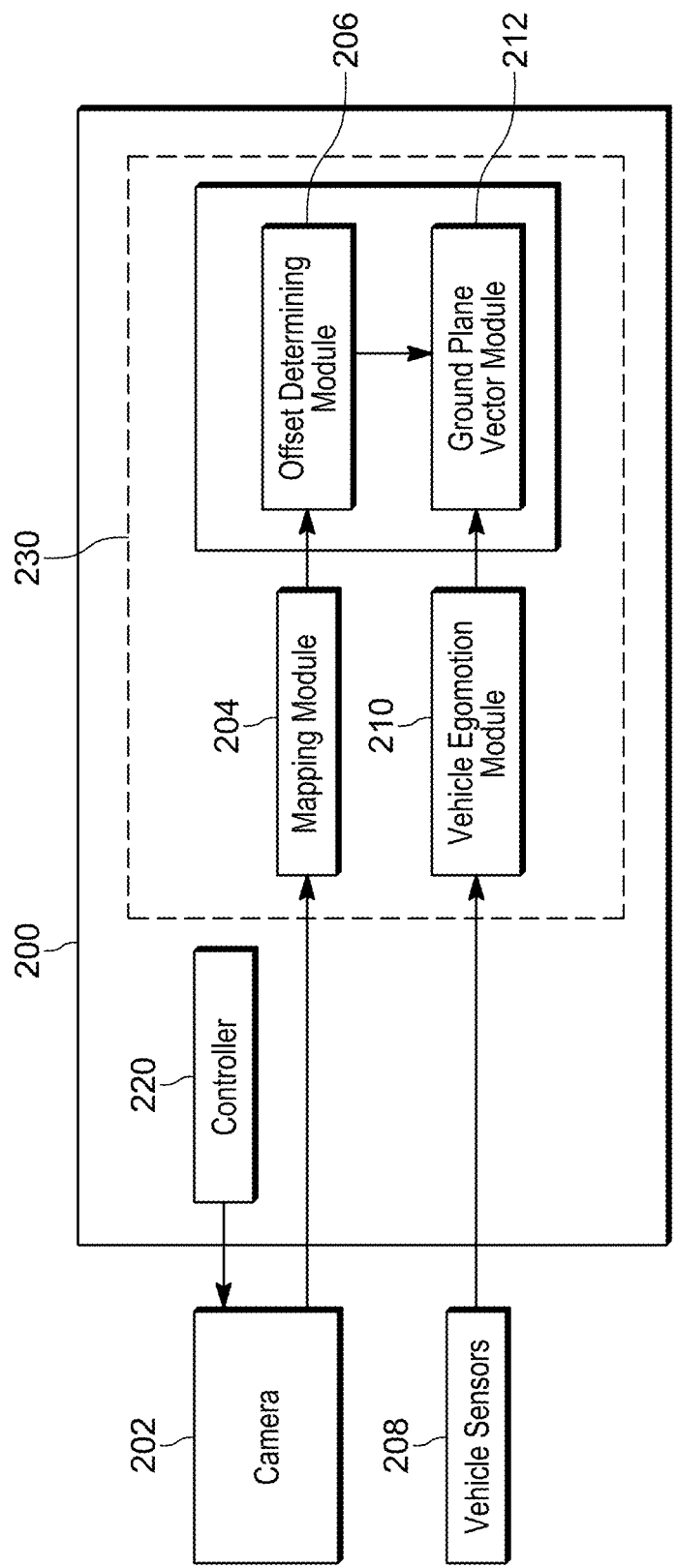
FIG. 2 shows a schematic diagram of a single camera calibration system.
Figure 3:
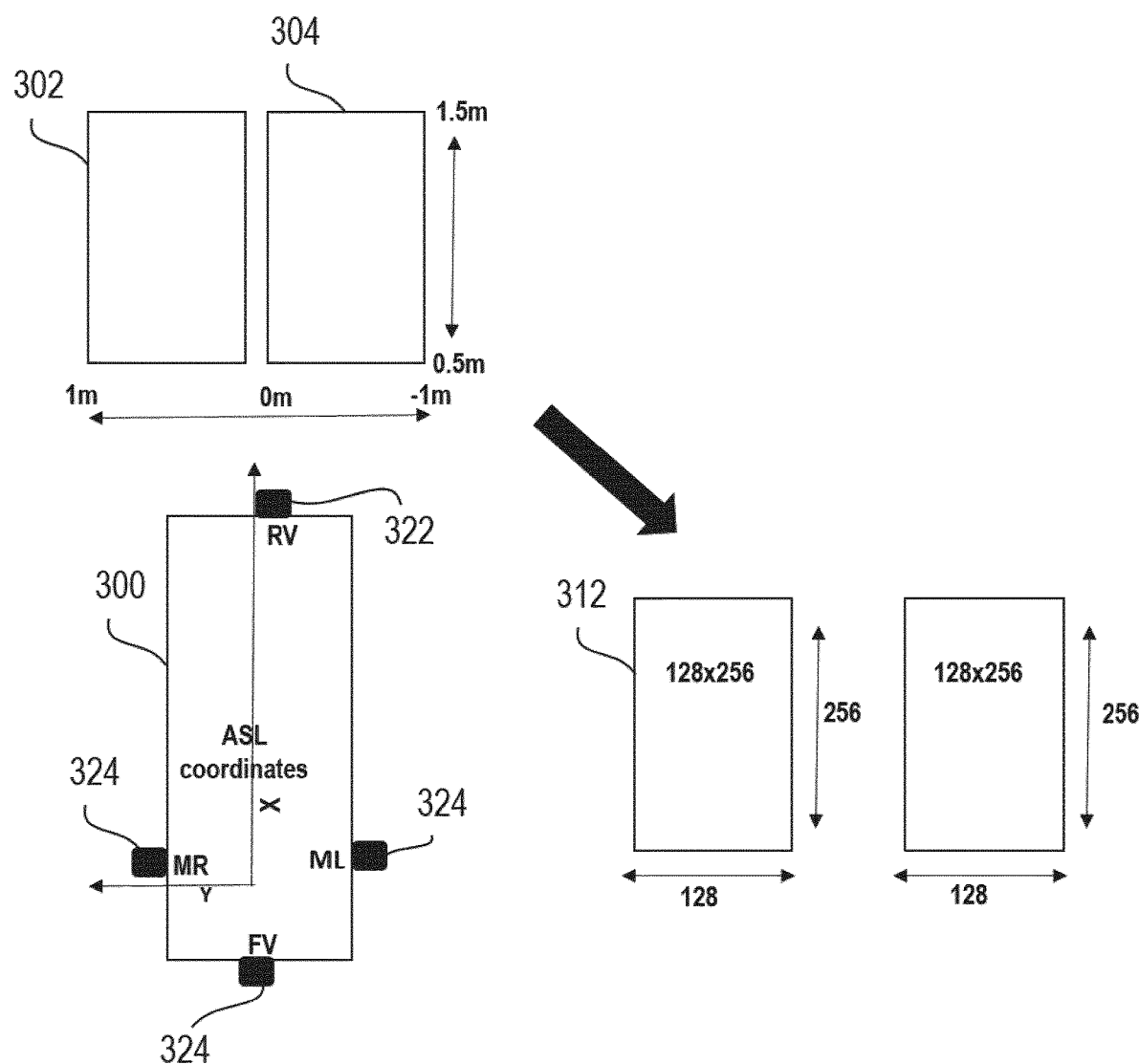
FIG. 3 shows an illustration of the ground plane mapping.

FIG. 2 shows a system 200 that is configured to determine extrinsic parameters. The system includes a camera controller 220 to control a camera 202 and a processing module 230. The single camera calibration system 200 may, for example, be installed in a vehicle for "online" calibration of a camera mounted on the vehicle. The camera 202 may be accessed using a cable or wirelessly. The processing module 230 includes a ground plane mapping module 204 to which raw images 202 are input and that converts the raw images to a pre-defined format. The raw images may, for example, capture images, each with two adjacent patches of a road on which the vehicle moves. The ground plane mapping module 204 may, for example, project a raw image 302 of a planar patch of the road with the size 1 m×1.5 m onto an image, or patch 312 with a size of 256*512 pixels as illustrated in FIG. 3 so that a resolution of 1/256=0.0039 meter per pixel along the length of the patch is obtained. This step is carried out for two images captured at two subsequent points of time, each including two patches of the road. For example, as illustrated in FIG. 3, the first image includes a left side patch 302 and a right side patch 304 with respect to the optical (x-) axis of the camera 322 at a first point of time, and two further patches of the road at a second point of time (not shown in FIG. 3). FIG. 3 shows further a vehicle 300 with rear view camera 322, which captures the images in this example, and further cameras 324 at the left, right and front sides of the vehicle 300. Also, the further cameras may capture images similar to the camera 322, so that also these images may be processed according to the described method.

Figure 4:
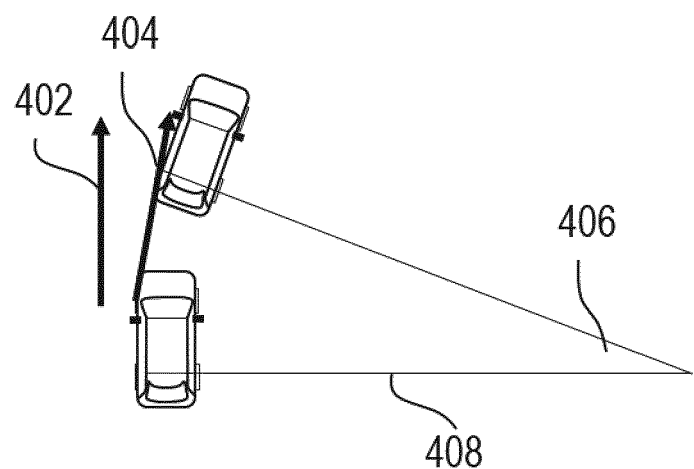
FIG. 4 shows an illustration of the Epipole computation.

At each moment (and in short time interval) the rear wheel's center is rotating along a center whose circumference the vehicle moves, as shown in FIG. 4. Referring to FIG. 2 and to FIG. 4, for the proposed method, values for the following parameters between any two moments of time are provided by the vehicle egomotion module 210: The Epipole length, i.e., length of vector 404, which will be used to determine the height of the camera, the angle between Epipole 404 and the direction Forward 402, which will be used to determine the direction Forward 402 through Epipole; and the angle 406 of the vehicle, and therefore of the camera rotation. This angle 406 will be is used to compensate the rotation of the spherical image. The input for the vehicle egomotion module 210, e.g., the speed of the vehicle, the angles of the wheels, and maybe suspension data, is provided by vehicle sensors 208, e.g., using a CAN bus. The values of the parameters are provided to the Ground Plane Vector module 212, which is described further below.

Figure 5:
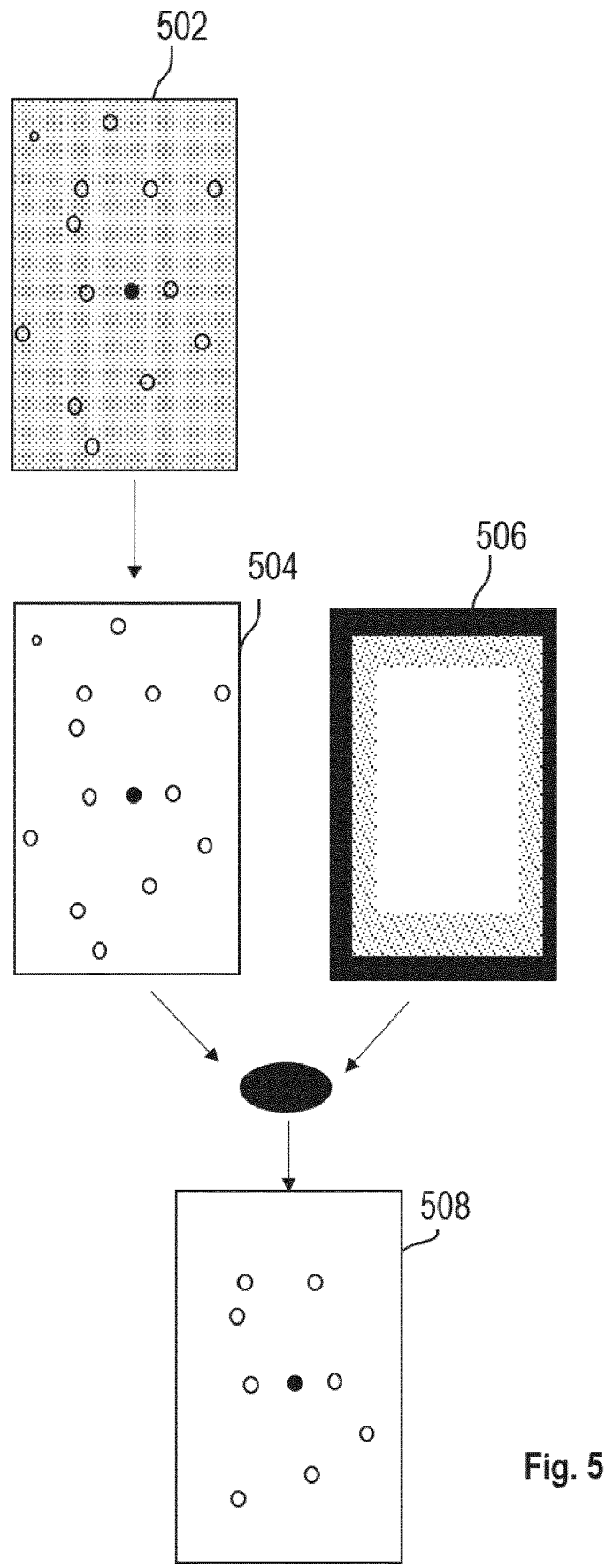
FIG. 5 shows a schematic diagram of the patch preprocessing before the frequency domain spectrum analysis.

Referring to FIG. 2 and to FIG. 5, in a further processing step, which is performed in offset determining module 206, the patches, e.g., patch 502 in FIG. 5, may be pre-processed by subtracting the mean value from the patch 502 and multiplying the obtained patch 504 with a Gaussian window 506 in order to suppress the pixels near the edge of the patch 504 and to make the features near the center of the image more prominent by giving them higher weightage. The resulting patch 508 then is used as an input for an FFT based spectrum analysis in order to determine the offset.

Figure 6:
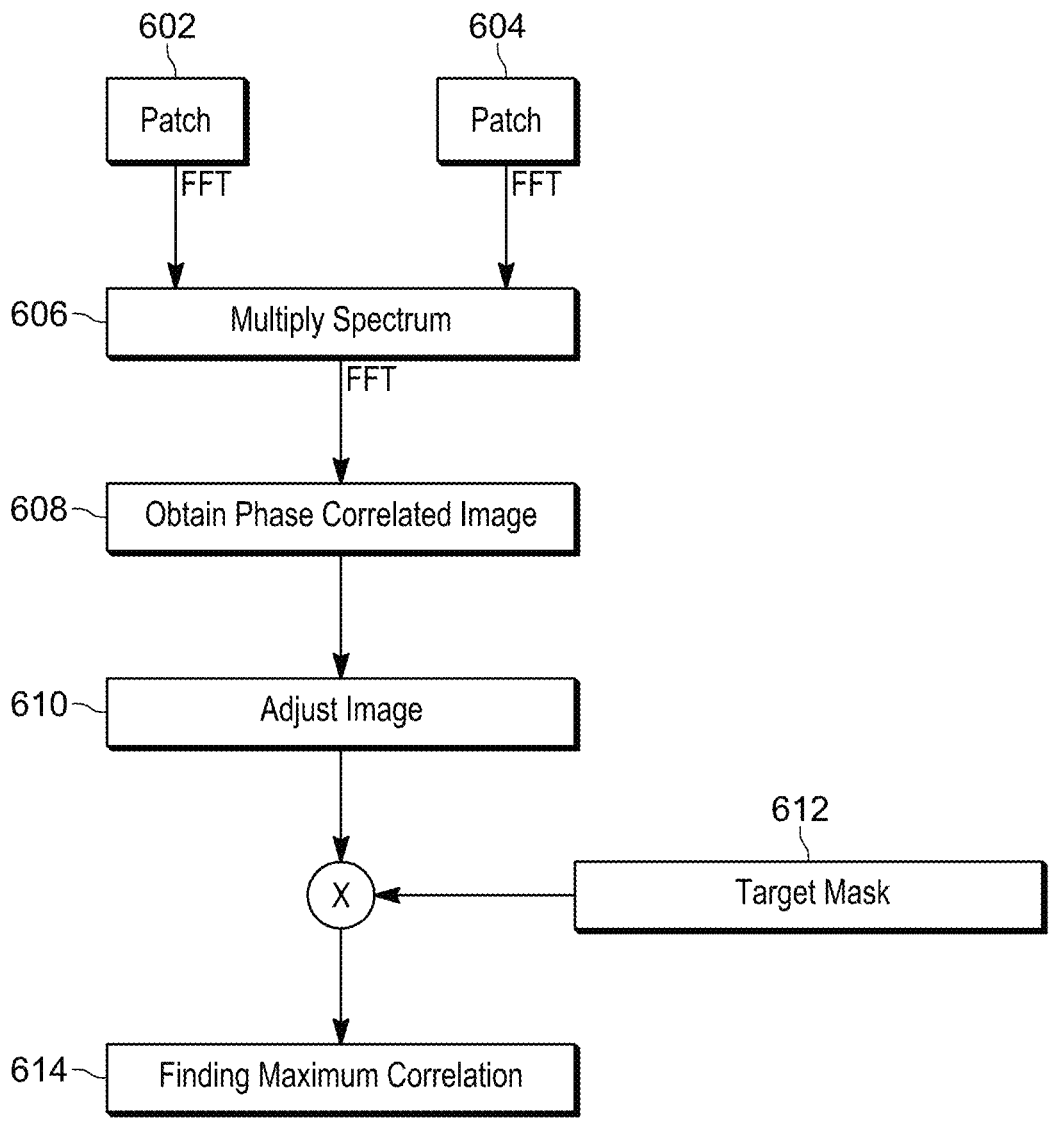
FIG. 6 shows a flow diagram of computing the frequency domain spectrum analysis and the offset between two patches.

Referring now to FIG. 6, by applying an FFT, the features of, e.g., a first left side patch 602 of the road captured at a first point of time may be matched to the features of a second left side patch 604 captured at a second point of time. As a result, an offset between features of the first 602 and the second 604 patch may be determined, corresponding to the distance, which the vehicle has travelled between the first point of time and the second point of time. The process is illustrated in more detail in FIG. 6. A phase correlation is carried out by transforming pre-processed images 602 and 604 using Fast Fourier Transformation (FFT). In 606, their spectrum is multiplied, and the product is inverse transformed (IFFT), whereby a resulting phase correlated image is obtained in 608. Once the IFFT is applied on the resultant spectrum and image in pixel domain is obtained, the resultant image is adjusted in 610 to get the zero-frequency component in the center. This simply means that when the two patches are phase correlated without any shift, then the result with no shift are placed in the center of the image. A target mask defining a predicted search window may be applied for finding in 612 the maximum correlation, i.e., the shifted pixel position. The reason for applying the target mask 612 is explained in the following. The peak pixel values in the phase correlated image provide the information about the shift between the two patches 602, 604. As the image scale changes and depending upon the mounting position of the camera, the appearance of the patch feature may change, too. This may result in multiple false high correlation values throughout the image. To overcome this, the peak values are predicted, and only in the neighbourhood of the predicted position of the pixels are considered. For that, a target mask is calculated, which gives weightage in an exponentially decaying fashion around the predicted position of the center pixel of the first patch. This target mask is multiplied with the phase correlated image and the peak value from the resultant image is used for calculating the pixel shift between the two patches. As mentioned above, since a correlation without a shift would result in peak pixel values in the center of the image, the center of the image is the reference position to which the shifted peak pixel values are related. Therefore, by subtracting the center pixel coordinates from the coordinates of the peak pixel values after phase correlation, the pixel shift is obtained.

Figure 7:
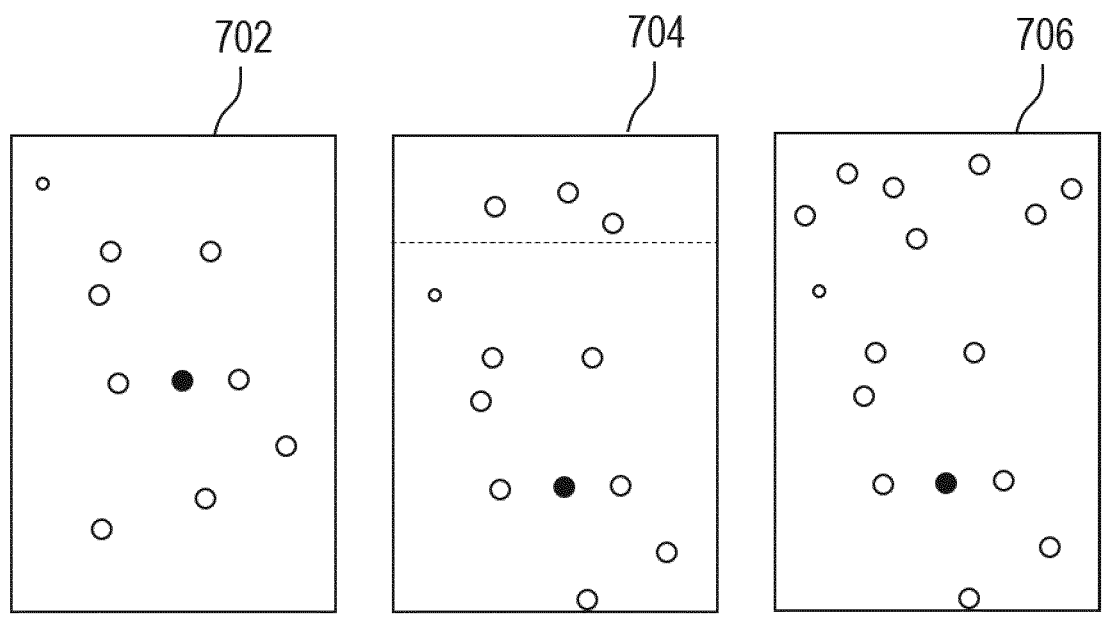
FIG. 7 shows an illustration of shifting a patch.

Referring to FIG. 7, in order to take more distinct features in the two patches 602, 604 into account, additionally, the gradient based similarity measure is used. For that, the first road patch, in FIG. 7 patch 702, is shifted by the computed shift of the pixels resulting in shifted patch 704. This shifted first patch 704 is compared with the third patch 706, i.e., the patch of the same, e.g., left side at the second point of time. A gradient image of the shifted first patch 704 and a gradient image of the third patch 706 of the second point of time are obtained, and the two gradient images are processed with the Gaussian blur filter. Finally, they are multiplied. The pixel coordinates for the peak value are considered as the feature point and can be related to the center of the image of the third patch 706. The corresponding pixel coordinate from the first patch can be simply computed by subtracting the computed pixel shift from the feature point.

Figure 8:
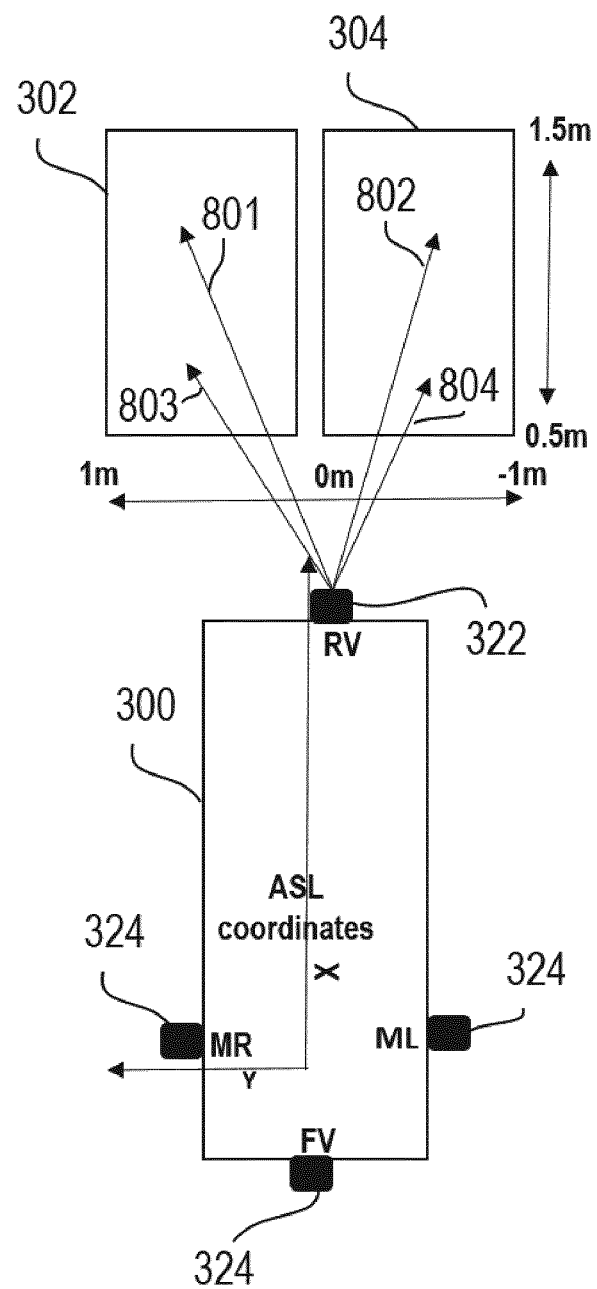
FIG. 8 shows a schematic diagram of the ground plane vectors from the camera to the feature points on the patches.

The above procedure is done on the two patches extracted from the left at two different points of time and from the right side of the camera at these two different points of time. This will provide four feature points and essentially four camera rays 801, 802, 803, 804 associated with these features as shown in FIG. 8. The camera ray is a unit vector corresponding to each of the four feature points in the camera frame of reference. Camera rays 801 and 802 are computed from the left side of the camera using two patches that are shifted against each other, and similarly, 803 and 804 are computed from the right side.

In the following, the epipolar model for computing the extrinsics is explained. The model is based on the unit vectors above which are supposed to have their origin at the camera lens and of a spherical camera, so that they intersect the sphere of the camera at positions or points A, B, C, and D.

For the epipolar model presented here, the spherical camera may be mounted on a vehicle. The direction "up" is defined as a normal to the road surface (also if the road is inclined). This direction is just a point on the sphere seen from the camera lens as origin. Another important direction is direction Forward. It is parallel to or lies on the long axis of the car, in the plane of the road surface, and therefore coincides with the direction where vehicle moves provided it moves straight forward. We refer to these directions as "direction Up" and "direction Forward". They are represented by two dots in the spherical camera. These two dots along with camera height include all the sought extrinsic parameters.

There also exists direction to the Right which is just a cross product Forward×Up. The three vectors Up, Forward and Right, as vector-columns in camera coordinates include a matrix M which is the output of the single camera calibration algorithm, along with the current camera height. Matrix M may be designated as "matrix of camera rotation".

Figure 9:
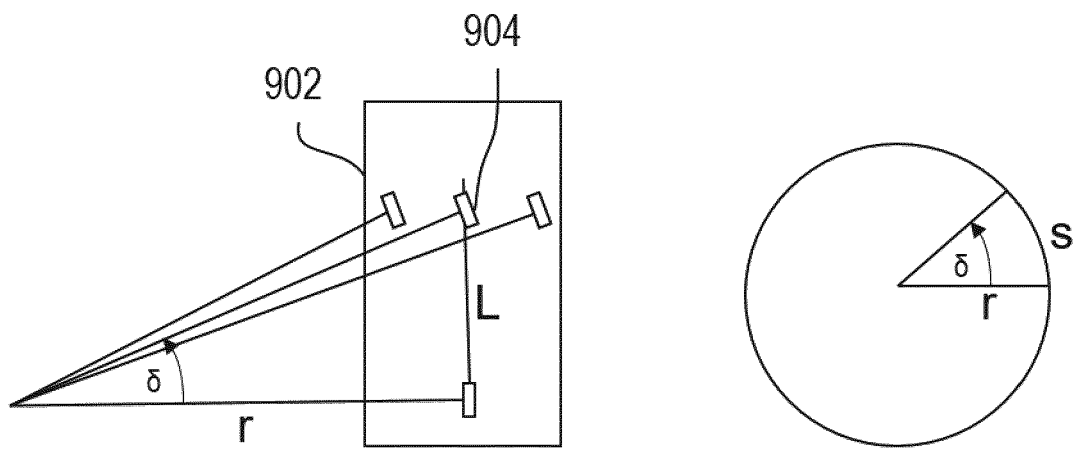
FIG. 9 shows a schematic diagram of an imaginary tire.

In the case that the vehicle is rotating at with a constant angle, Ackerman's steering model is applied, according to which to illustrate how the camera position moves due to the current speed and steering of the vehicle, Ackerman's steering model is applied, as shown in FIG. 9. If the vehicle 902 is rotating with the constant steering, then it is the question, what circular trajectory will be made by all four tires. According to Ackerman's steering model, a tire 904 in the center of the front axle is introduced as an imaginary tire. The vehicle steering information can be used to determine the angle at which this imaginary tire 904 has turned. It is important to note that the central, inner and outer tires run on a different circular trajectory. We know the angle at which the central imaginary tire has turned, which is the steering angle ($\delta$), and this angle can be used to compute the radius information (r) using $\tan(\delta)=L/r$, where L is the distance between the axes of the front wheels and the rear wheels. Using the equation of circle $s=r\delta$, can also provide the radius, if the length of the arc (s) is known.

In the following the epipolar model and the application of the epipolar model for calculating the extrinsics are explained in the following.

Figure 10:
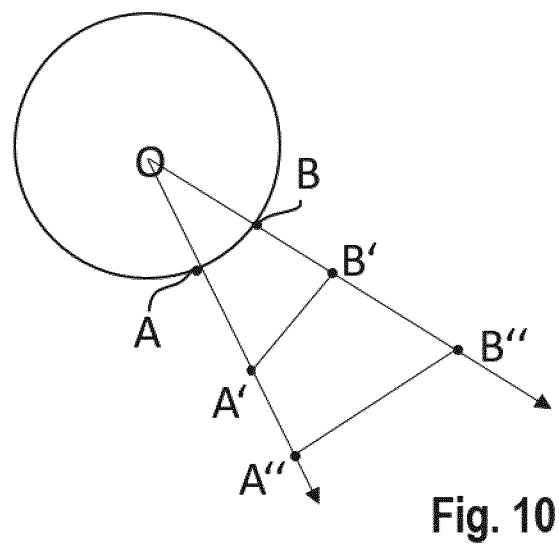
FIG. 10 shows an illustration of the interpretation of two points on the sphere of the camera.
Figure 11:
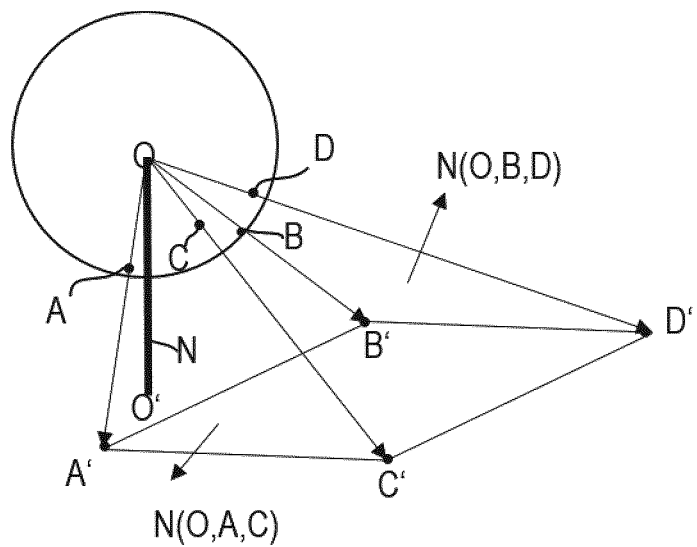
FIG. 11 shows an illustration of the geometry of the points on the sphere of the camera and the center of the camera projected to the ground plane, and normal vectors of the spanned planes.
Figure 11:
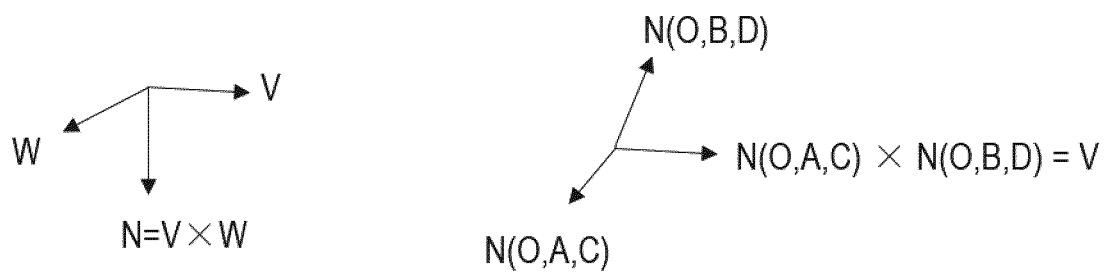

FIGS. 10 and 11 illustrate how the direction of two viewed parallel segments seen from a spherical camera can be determined. FIG. 10 illustrates that when observing two points A and B on the spherical camera, the real points can't be determined. The real point of A might be A' or A", and the real point of B might be B' or B". Even if knowing the length of the segment A' B', the points A' or B' can't be determined.

However, the three known points O, A, B define a plane passing through them. This plane is defined by its orthogonal vector which can be found as a cross product of two vectors in this plane, which is the normal vector N(O, A, B)=OA×OB. Now, suppose we have two parallel segments defined by the real points A'C' and B'D' as depicted in FIG. 11. These points appear in the spherical camera as points AC and BC. The direction A'C' is orthogonal to N(O,A,C). It is also (as being the same as direction B'D') orthogonal to N(O,B,D). Therefore, the real world direction A'C' is parallel to the cross-product N(O,A,C)×N(O,B,D), and the latter is available in the camera coordinates.

We conclude, that the parallel segments A'C' and B'D' (depicted in the camera as AC and BD) are both parallel to vector V=(OA×OC)×(OB×OD). The sign is checked by dot-product (·) of vectors:

If V·AC>0 then V and A'C' have the same direction

If V·AC<0 then V and A'C' have opposite directions

In the parallelogram A'C'D'B' with points ACDB in the spherical image a 3D construction can be performed. Using above formulas for parallel segments we find the two directions of the sides of the parallelogram as, V=(OA×OC)×(OB×OD) and W=(OA×OB)×(OC×OD). The normal to the parallelogram is their cross-product V×W. We define outer normal N as follows, If (V×W)·OA<0 then N=V×W/norm(V×W);

If (V×W)·OA>0 then N=−V×W/norm(V×W);

Here, OA can be safely replaced by Oft OC or OD.

Considering now the projection O' of O to the plane of the parallelogram, if denoting H as length of O'O, we can express $$OA'=OA*H/(-N·OA)$$

$$OB'=OB*H/(-N·OB)$$

$$OC'=OC*H/(-N·OC)$$

$$OD'=OD*H/(-N·OD)$$

Therefore, norm (B'A')=norm (OA*H/(−N·OA)−OB*H/(−N·OB)) From here, H=norm (B'A')/norm (OA/(−N·OA)−OB/(−N·OB))

Thus, knowing the length of one side of the parallelogram (in our example length A'B'), then we can determine the position all its four vertices in the space expressed in camera coordinates.

Figure 12:
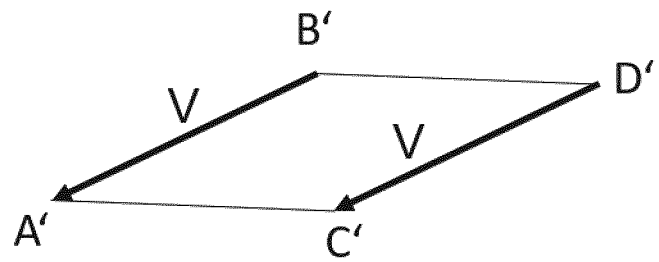
FIG. 12 shows an illustration of a camera movement.

In a simple first scenario 1, the camera moves straight without rotation. Suppose a camera moves straight parallel to the road without rotations as shown in FIG. 12, so that it moves between two frames by a vector V. Suppose further that we traced two points so that point A and C on the road in the first frame appeared as B and D in the second frame. Instead of moving the camera by V we can assume that camera is still but the road moved by −V. Points A and C represent real points A' and C' on the road. Then, the road would have moved by −V, and the points A' and C' would appear in new places B', D', such that B'=A'−V and D'=C'−V. Points B' and D' are seen in the spherical camera as B and D. Points A', C', B'=A'−V and D'=C'−V form a parallelogram as shown in FIG. 12.

Now supposing in the first scenario that the vehicle moves straight without rotation, then vector V is the vector of the straight movement of the vehicle. Since speed and time between the two frames are known from the CAN data, we know the length of V. Therefore, using the formulas derived above for the parallelogram, we can compute the direction of V, the normal N, and the distance H form the camera to the road. These parameters define the sought extrinsics in this simple scenario.

In a second scenario, the camera moves with a rotation along a known axis and with a known angle. This scenario can be reduced to the previous one if we compensate the rotation, that is, rotate camera back. The camera rotates around axis OZ which is orthogonal to the road. In this case, OZ is known in the camera coordinates. Designating the known angle of rotation, which occurred between the two frames, as CarAngleOfRotation Rotation matrix for a rotation around the known axis OZ_iter with known angle is described by Rodrigues formula, it is computed as Rodrigues(*OZ_iter*\*CarAngleOfRotation).

Now, let us consider how the rotation can be compensated. Please notice, that the camera really moves in curved way, but since we are interested only in the two positions and we can adopt that camera moved straight between them, just along the Epipole vector. The movement of the camera between the frames can be described in two stages: First, straight movement along the Epipole vector V without rotation. Second, a rotation (to CarAngleOfRotation) to the camera at its new position is applied. After the first movement, the points A', C', will become B'=A'−V and D'=C'−V, and the four points form a parallelogram, exactly in the same manner as in the previous section. Then, at the second movement, points B and D rotate with the inverse of Rodrigues(OZ_iter\*CarAngleOfRotation). This may be understood by the following consideration: if the camera rotated to the right, then the visible image rotated to the left. After the whole movement and the first and second steps described above have been accomplished, we can see the points as B_ and D_ in the spherical image, i.e., they are available for the computation. However, we would like to get B and D, which are not directly available.

$$OB=\text{Rodrigues}(OZ*\text{CarAngleOfRotation})*OB\_;$$

$$OD=\text{Rodrigues}(OZ*\text{CarAngleOfRotation})*OD\_;$$

Then, we end up with the first scenario 1, so that we can find the Epipole V, compute the normal N, and the height of the camera using the fact that the length of the Epipole is known due to known ego motion of the vehicle and the camera.

Note, that we compute normal N. If all the conditions hold exactly, N should be equal to OZ.

Since we know the angle between the Epipole V and the direction Forward, we can find the direction Forward by rotating V around N to that known angle. We conclude that we obtain the direction Up as N, direction Forward, and the height of the camera, and thus the extrinsics.

An optimal estimator is proposed that provides a more precise measurement of the extrinsic parameters during calibration procedure. The spread of the calibration measurements gets wider because of physical mounting deviations of the camera therefore affecting precision. The optimal estimator takes the history of sample calibrations over time and iteratively adjusts the extrinsic samples into a converged output by applying sample statistics and combined error analysis.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfil the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A method for determining extrinsic parameters of a camera, comprising:
    starting to move a single camera in a vehicle;
    capturing, by the moving camera, a first raw image with a first patch and a second patch parallel to the first patch at a first point of time, and a second raw image with a third patch and a fourth patch parallel to the third patch at a second point of time, wherein a distance between the first patch and the second patch is the same as a distance between the third patch and the fourth patch;
    detecting a reference position A of at least one first image feature in the first patch, a reference position C of at least one second image feature in the second patch, an offset position B of the at least one first image feature of the first patch in the third patch, and an offset position D of the at least one second image feature of the second patch in the fourth patch;
    applying the reference positions A and C, the offset positions B and D and a determined distance travelled by the moving camera as the vehicle moves between the first point of time and the second point of time to an epipolar model; and
    determining extrinsic parameters of the camera as an output of the epipolar model.

2. The method of claim 1, wherein the movement of the camera is a linear movement, a circular movement, or both; and wherein the distance travelled by the moving camera is determined by at least one of an external sensor or measurement data.

3. The method of claim 1, wherein the camera is a fisheye camera, and wherein detecting a reference position A, an offset position B, a reference position C, and an offset position D comprise a ground plane mapping of the first, the second, the third and the fourth patches to obtain corresponding patches as 2-dimensional ground plane images in a virtual plane in a pre-defined image format.

4. The method of claim 3, wherein the first, the second, the third and the fourth patches in the virtual plane are pre-processed, wherein the pre-processing comprises subtracting a mean brightness value, and applying a Gaussian window, wherein the Gaussian window has a maximum in a center of an image, and a minimum at edges of the image.

5. The method of claim 1, wherein the offset position B of the third patch with respect to the reference position A of the first patch, and the offset position D of the fourth patch with respect to the reference position C of the second patch are determined by performing a phase correlation.

6. The method of claim 5, wherein the phase correlation comprises a Fast Fourier Transformation.

7. The method of claim 1, wherein the reference positions A and C, and the offset positions B and D are relative positions and the offset is determined using a gradient based similarity measure.

8. The method of claim 1, wherein the positions A, B, C and D are positions in a coordinate system,
    wherein an origin of the coordinate system coincides with a lens of the camera; and
    wherein detecting a reference position A, an offset position B, a reference position C, and an offset position D further comprises determining ground plane unit vectors from the origin of the coordinate system to the reference positions A and C, and to the offset positions B and D.

9. The method of claim 8, wherein of applying an epipolar model comprises using the ground plane unit vectors to determine in a first sub-step a first direction V from reference position A to the offset position C, which is the same direction as from the reference position B to the offset position D, and a second direction W from the reference position A to the reference position B, which is the same direction as from the offset position C to the offset position D, determining a normal vector N=V×W of the first direction V and the second direction W, and determining a height of the camera by determining the vectors from the origin to real positions A', B', C' and D' corresponding to the image positions A, B, C and D, respectively.

10. A single camera calibration system for calibrating a camera, comprising:
    a camera controller configured to control a single camera in a vehicle, the single camera to be calibrated such that the camera captures, when in motion as the vehicle moves, a first raw image with a first patch and a second patch parallel to the first patch at a first point of time, and a second raw image with a third patch and a fourth patch parallel to the third patch at a second point of time, wherein a distance between the first patch and the second patch is the same as a distance between the third patch and the fourth patch; and
    a processing module, configured to:
    detect a reference position A of at least one image feature in the first patch, a reference position C of at least one image feature in the second patch, an offset position B of the at least one feature of the first patch in the third patch, and an offset position D of the at least one feature of the second patch in the fourth patch;
    apply an epipolar model based on the reference positions A and C, the offset positions B and D and a determined distance travelled by the moving camera between the first point of time and the second point of time; and
    determine extrinsic parameters of the camera as an output of the epipolar model.

11. The single camera calibration system of claim 10, wherein the camera is controlled by the camera controller, wherein the camera is mounted on a vehicle.

12. A vehicle comprising the single camera calibration system for calibrating the camera according to claim 10.

13. The single camera calibration system of claim 11, wherein a determination is made of the extrinsic parameters of the camera mounted on the vehicle.

14. A non-transitory computer program element, comprising instructions which, when the program element is executed by a computer, cause the computer to carry out the method of claim 1.

15. A non-transitory computer-readable medium comprising instructions which, when executed by a computer, cause the computer to carry out the method of claim 1.

* * * * *